(12) United States Patent
Monroe

(10) Patent No.: US 12,516,510 B2
(45) Date of Patent: Jan. 6, 2026

(54) DRAINING DEVICE FOR DRAINING A LIQUID CONDUIT SYSTEM

(71) Applicant: Bruce M. Monroe, Flower Mound, TX (US)

(72) Inventor: Bruce M. Monroe, Flower Mound, TX (US)

(*) Notice: Subject to any disclaimer, the term of this patent is extended or adjusted under 35 U.S.C. 154(b) by 48 days.

(21) Appl. No.: 18/088,420

(22) Filed: Dec. 23, 2022

(65) Prior Publication Data

US 2024/0209599 A1      Jun. 27, 2024

(51) Int. Cl.
*E03B 7/08* (2006.01)
*E03B 7/10* (2006.01)
*F16L 55/07* (2006.01)

(52) U.S. Cl.
CPC .............. *E03B 7/08* (2013.01); *E03B 7/10* (2013.01); *F16L 55/07* (2013.01)

(58) Field of Classification Search
CPC .... F16L 55/07; E03B 7/12; E03B 7/08; Y10T 137/3127
See application file for complete search history.

(56) References Cited

U.S. PATENT DOCUMENTS

| | | | |
|---|---|---|---|
| 3,845,779 A * | 11/1974 | Greene, Jr. | ............. F16K 15/20 285/354 |
| 4,809,732 A * | 3/1989 | Buehler | ................. A01G 25/00 239/106 |
| 5,433,246 A | 7/1995 | Horton | |
| 5,598,867 A | 2/1997 | Sullivan | |
| 5,676,182 A | 10/1997 | McMullen, Jr. et al. | |
| 5,931,184 A * | 8/1999 | Armenia | ................. F16L 55/07 285/123.1 |
| 6,237,620 B1 | 5/2001 | Ferguson | |
| 6,321,773 B1 | 11/2001 | Ramsby | |
| 7,533,906 B2 | 5/2009 | Luettgen et al. | |
| 10,697,156 B2 | 6/2020 | Paul et al. | |
| 2007/0221272 A1 | 9/2007 | Apsley | |
| 2010/0206392 A1 | 8/2010 | Ball et al. | |

(Continued)

FOREIGN PATENT DOCUMENTS

| | | |
|---|---|---|
| CN | 107082002 A | 8/2017 |
| DE | 202022102901 U1 * | 9/2022 ............... E03B 9/02 |

(Continued)

OTHER PUBLICATIONS

Airflow Range, "Airflow Series Suitable for fixed applications," Sep. 10, 2021, available on the Internet: https://www.pclairtechnology.com/couplings-adaptors/pcl-couplings-adaprtors/airflow-range, 4 pages.

(Continued)

*Primary Examiner* — Zachary T Dragicevich
(74) *Attorney, Agent, or Firm* — Dorsey & Whitney LLP

(57) ABSTRACT

A draining device for use with a fluid spout includes a main body including a stem portion defining a first aperture configured to fluidly couple with a pressure source. The main body may further define a base portion defining a second aperture configured to fluidly couple with a fluid spout of the fluid spout. The main body may further define an internal passage extending from the first aperture to the second aperture. The main body may fluidly couple the pressure source and the fluid spout through the passage.

25 Claims, 11 Drawing Sheets

(56) References Cited

U.S. PATENT DOCUMENTS

2014/0026928 A1    1/2014  Paul et al.
2014/0326345 A1  11/2014  Kuo
2016/0069049 A1    3/2016  Nonnenberg

FOREIGN PATENT DOCUMENTS

JP         3227595 B2    11/2001
JP      2007021309 A     2/2007
WO    2016098307 A1     6/2016

OTHER PUBLICATIONS

Uxcell, "Imported 2Pcs Quick Release Coupler Connector Air Line Hose Coupling Compressor SH20," Amazon, Sep. 10, 2021, available on the Internet: https://www.amazon.in/Release-Coupler-Connector-Coupling-Compressor/dp/B01HG42UZK, 6 pages.

PCL, "Search results for: 'airflow coupling hose tailpiece,'" available on the Internet at https://usd.pclairtechnology.com/catalogsearch/result/?q=airflow+coupling+hose+tailpiece, obtained May 25, 2023, 9 pages.

U.S. Patent and Trademark Office, "International Search Report and Written Opinion," mailed Apr. 1, 2024, for PCT Application No. PCT/US2023/084861, 14 pages.

\* cited by examiner

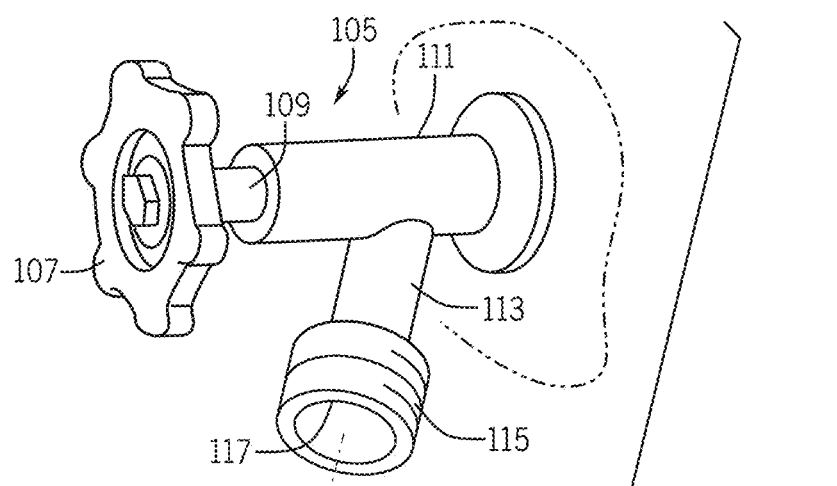
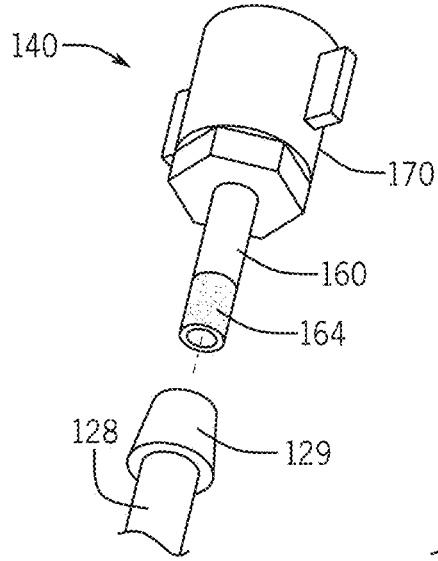
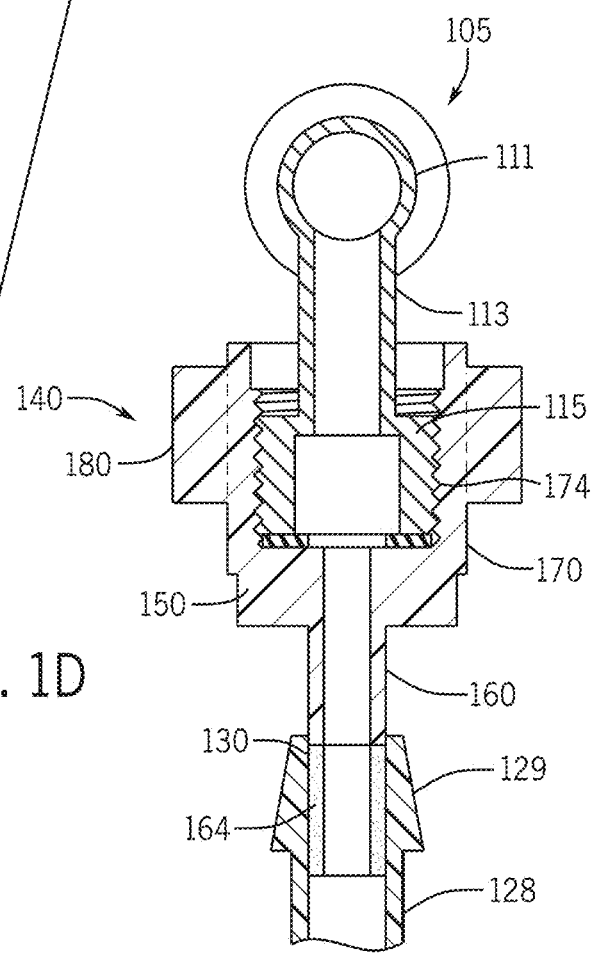
FIG. 1C
FIG. 1D

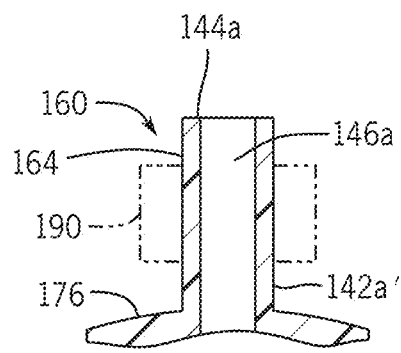
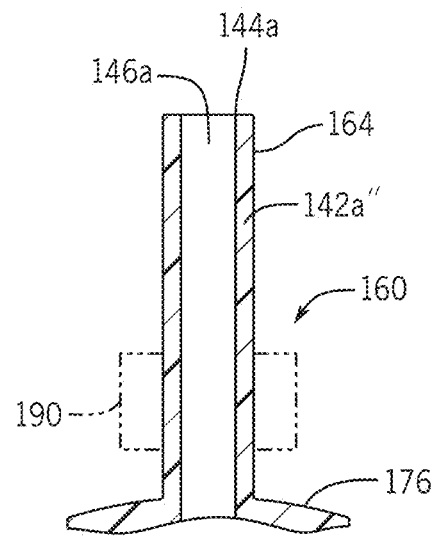
FIG. 4A  FIG. 4B
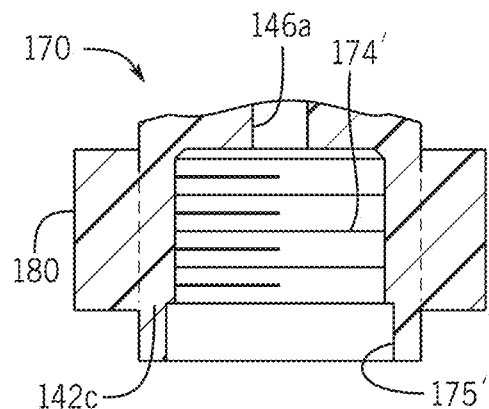
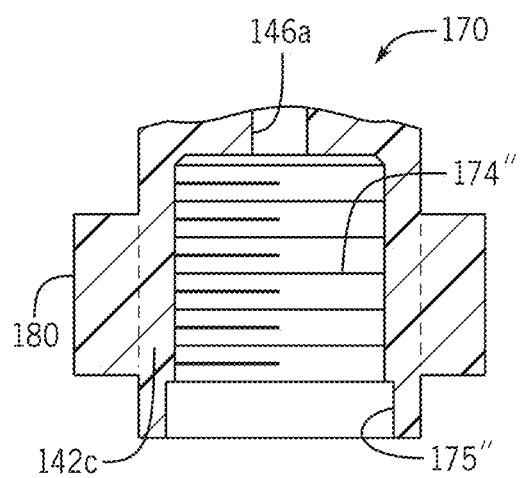
FIG. 5A  FIG. 5B

DRAINING DEVICE FOR DRAINING A LIQUID CONDUIT SYSTEM

FIELD

The described examples relate generally to draining a liquid system, and devices, and methods of use thereof.

BACKGROUND

Water held in pipes or other elements of a water system or plumbing system of a structure (e.g., a house in a rural, suburban, or urban environment, a mobile home, or a recreational vehicle) may need to be drained on occasion, such as in the cold periods of the year when they are susceptible to freezing. Freezing water may result in damage to plumbing systems, including inducing stresses in pipes and fittings that may cause mechanical failures and contribute to uncontrolled fluid release from the plumbing system. It may therefore be desirable to purge the plumbing system of water to mitigate such failures. For example, compressed air may be introduced into a plumbing system in order to remove a sufficient quantity of water to reduce or eliminate stresses in the system that would otherwise be caused by freezing water.

Conventional techniques for purging plumbing or water systems may be particularly unsuited for introducing compressed air into a plumbing system via water spout or bib. Standard air compressors may deliver compressed air through a coupling or end piece that is not configured for fluidic connection with a plumbing system, such as being configured for fluidic connection with the water faucet or bib of a residential structure. Conventional adaptors for an air compressor often implement multi-component assemblies, including movable components, which may contribute to fluid loss and other inefficiencies. And once connected, it may not be possible to turn or adjust the adaptor, such as tightening or loosening the fluid coupling between the adaptor and the air compressor and/or plumbing system connection. As such, there is a need for systems and techniques to improve introducing compressed air into a plumbing system, such as for winterizing a home.

SUMMARY

Examples of the present invention are directed to a draining device for draining a liquid from a system, such as for example a water system, and methods of use thereof.

In one example, a device for draining a liquid system for use with a liquid or fluid spout (such as for example a bib or spigot often used with fluids, such as in one example water) is disclosed. The liquid in the system may be water or another fluid substance. The draining device may include a main body formed of a unitary single piece of material. The main body defines a stem portion defining a first aperture configured to fluidly couple with a pressure source. The main body may further define a base portion defining a second aperture configured to fluidly couple with, for example, a water spout of the water bib. The main body may further define an internal passage extending from the first aperture to the second aperture. The main body fluidly couples the pressure source and the water bib through the passage. The main body may further defines at least one base portion wing.

In another example, the main body may include a spout engagement feature within the second aperture. The spout engagement feature may be configured to releasably secure the draining device to the water spout. The spout engagement feature may be arranged adjacent the stem portion. The main body may further define a collar region adjacent the spout engagement feature, opposite the stem portion. Further, the collar region may be configured to fit about the water spout and permit unimpeded passage of the water spout.

In another example, the main body may include a base portion body. The spout engagement feature may be defined by a series of ridge features or groove features of the base portion body. The collar region may be defined by a thinned-walled section of the base portion.

In another example, the main body may further define an intermediate portion, integrally formed with the base portion and the stem portion, and arranged there between. In one example the intermediate portion may be a shoulder portion, or alternatively may be a flexible conduit portion. The intermediate portion, including the shoulder portion, may define a tool engagement feature. The tool engagement feature may include a multifaceted peripheral surface of the intermediate portion. The multifaceted peripheral surface may include at least four sides.

In another example, the main body may further define a pair of base portion wings. The pair of base portion wings may be integrally formed with, and extending from generally opposing sides of, the base portion. One or both base portion wings of the pair of base portion wings may include a contoured surface configured to define a structure facilitating applying a torque through a user's grip, which may include a finger grip.

In another example, the main body may further define a pair of stem portion wings. The pair of stem portion wings may be integrally formed with and extending from generally opposing sides of the stem portion. In some cases, the stem portion may include an engagement surface at the first aperture. The engagement surface may be configured to removably attach a coupling portion of the pressure source to the stem portion. Further, the main body may include a stem portion body. The engagement surface may be defined by a roughened outer surface of the stem portion.

In another example, a draining device for use with a water bib is disclosed. The draining device may include a stem portion having an engagement surface configured to releasably couple with a coupling portion of a pressure source. The draining device further includes a base portion having a spout engagement feature configured to releasably couple with a water spout of the water bib. The stem portion and the base portion are integrally connected to one another and define a common fluid passage between a first fluid opening at the stem portion and a second fluid opening at the base portion.

In another example, the stem portion may be defined by a stem portion body having a first width. Further, the base portion may be defined by a base portion body having a second width that is greater than the first width. The stem portion body and the base portion body may be portions of a unitary single piece of material.

In another example, a multifaceted shoulder portion may be integrally formed between the stem portion and the base portion.

In another example, the draining device may further include at least one wing portion integrally formed with the stem portion or the base portion, the at least one wing portion defining a finger grip.

In another example, the first fluid opening may have a first diameter. The second fluid opening may have a second diameter. In some example, the second diameter may be at least three times larger than the first diameter. In other examples, the second diameter may be less than or equal to 3 times larger than the first diameter.

In another example, a method of winterizing a structure is disclosed. The method includes fluidly coupling a stem portion of a draining device to a pressure source. The method further includes fluidly coupling a base portion of the draining device to a spout of a water bib. The base portion and the stem portion may be integrally formed with one another and defined a common fluid passage through the winterizing structure. The method may further include tightening the fluid coupling of one or both of: the stem portion and the pressure source, or the base portion and the spout, by engaging at least one wing extending integrally from the stem portion or the base portion.

In another example, the method may further include tightening the fluid coupling of one or both of: the stem portion and the pressure source, or the base portion and the spout, by engaging one or more sides of a multifaceted peripheral surface with a tool. In some cases, the method may further include operating an air compressor of the pressure source to advance compressed air into the water bib via draining device.

In addition to the exemplary aspects and examples described above, further aspects and examples will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIG. 1C depicts an exploded view of the draining device, water faucet, and air compressor coupling of FIG. 1B;

FIG. 1D depicts a cross-sectional view of the draining device, water faucet, and air compressor coupling of FIG. 1B, taken along line 1D-1D of FIG. 1B;

FIG. 4A depicts an example shortened stem portion for the draining device of FIG. 2;

FIG. 4B depicts an example elongated stem portion for the draining device of FIG. 2;

FIG. 5A depicts an example shortened base portion for the draining device of FIG. 2;

FIG. 5B depicts an example elongated base portion for the draining device of FIG. 2;

DETAILED DESCRIPTION

Figure 1A:
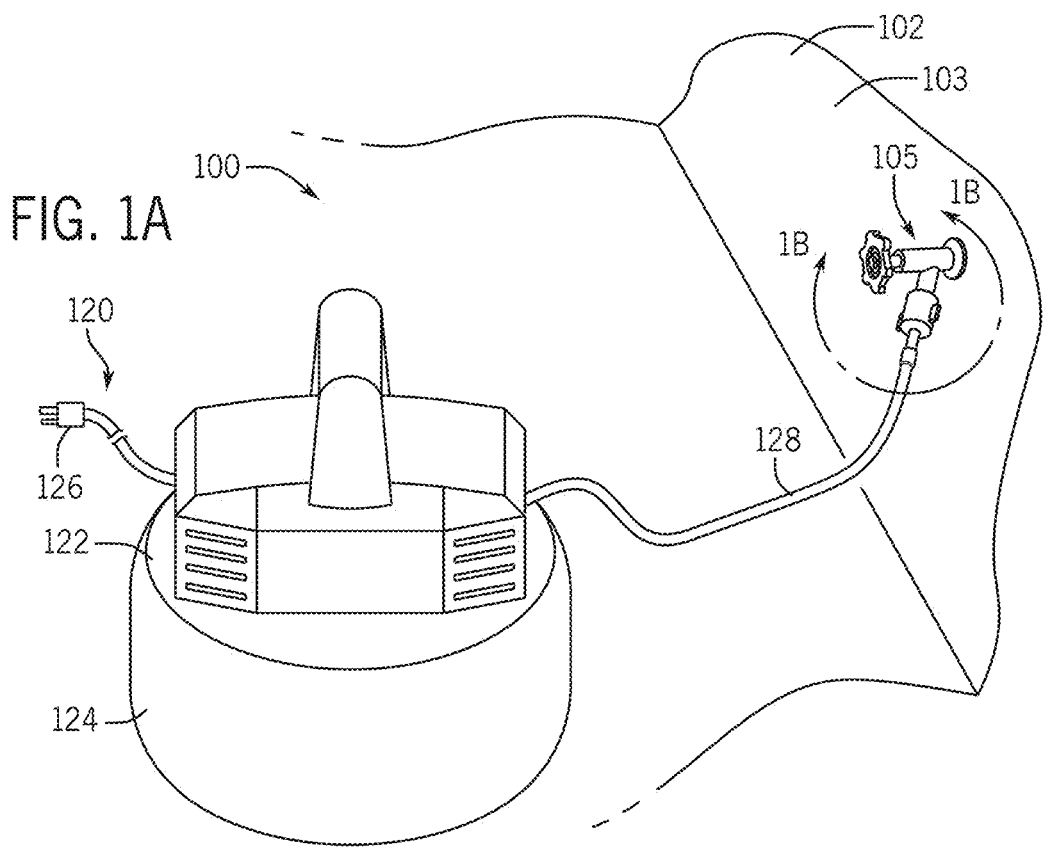
FIG. 1A depicts an example system for wintering a structure including an example draining device.

The description that follows includes sample systems, methods, and apparatuses that embody various elements of the present disclosure. However, it should be understood that the described disclosure may be practiced in a variety of forms in addition to those described herein.

The following disclosure relates generally to draining devices and associated systems and methods of use. The draining device may be substantially any type of device that is configured to define a fluid coupling between a source of pressure, such as compressed air, and a plumbing or liquid system, which system may include a network of conduits for transporting the liquid through a part of or all of a structure in which the conduits are positioned. In one example, the liquid system may be a water plumbing system that may be a substantially indoor plumbing system for a structure, such as a commercial or residential structure in a rural, suburban, urban or other environment. The plumbing system may be an outdoor system, such as a sprinkler system for a yard, or a water distribution system that may be indoors or outdoors. The plumbing system may be in a movable structure, such as a recreational vehicle, for example a motorhome, camper van, camper, or another type of vehicle or movable structure that includes a system of conduits that direct liquid throughout a part of or all of the vehicle. The liquid system may need the liquid evacuated, or drained, for various reasons, such as that it may be susceptible to mechanical failure induced by freezing. For example, some portion of the plumbing system may be uninsulated or exposed, such as outdoors (e.g., an outdoor faucet or bib) and/or otherwise exposed to an ambient environment, such as pipe runs in an uninsulated subfloor of the structure. The source of pressure may be compressed air created by air compressors of various types, capacities, and pressure ratings. The air compressor may deliver compressed air through an air compressor coupling. The source of pressure may be a fluid under pressure, such as being moved by a pump, into and through the draining device. The pressure source may provide pressure into the liquid system through the draining device. The pressure may be provided by air pressure (pneumatic) or liquid pressure (hydraulic). If liquid pressure, the fluid system may not be emptied after using the draining device, but may instead have one liquid replaced with another liquid. For instance, the water in a liquid system may be replaced by antifreeze.

In the description herein, the non-limiting examples are described with respect to use of pneumatic (air) pressure for clarity. While the invention or inventions are described herein, as an example, with respect to a liquid in the form of water, the liquid may be another type of fluid that is carried in a system of conduits, including anti-freeze fluid, industrial, pharmaceutical, chemical or other commercial fluid types.

The draining device of the present disclosure may define a fluid coupling between a source of compressed air and the plumbing system using a main body formed of a unitary single piece of material. The single piece of material of the main body may eliminate the multi-component assembly of conventional fluid adaptors. In this regard, the main body of the disclosed draining device may minimize leaks and support fluid throughput by reducing the component count (and potential leak paths) between the air compressor and plumbing system. The main body formed from the single piece of material may further be configured for manual adjustment of the fluid coupling or fit, such as by allowing turning for tightening or loosening the adaptor relative to the air compressor and/or plumbing system connection. This may allow for fine-tuned control of the draining device and adaptation of the draining device to a range of conditions, such as adapting the draining device for different system pressures, as needed.

The main body of the draining device may accommodate the differently sized and shaped fluid couplings of the air compressor and the plumbing system. For example, the air coupling of the air compressor may have a different size and shape as compared to the fluid coupling (e.g., water faucet, water bib) of the plumbing system. Accordingly, the main body of the draining device may transition from a first, larger size to a second, relatively smaller size along a length of the draining device, which may resemble a T-shape. For example, the main body may include a stem portion and a base portion, integrally connected to one another, and defining a common fluid passage between a first fluid opening at the stem portion and a second fluid opening at the base portion. The stem portion may define an elongated or skinny end of the T-shape and have the first fluid aperture or opening configured to fluidly couple with the air coupling, including having a size, shape, and engagement features (e.g., a roughed surface, ratcheted contour, threads and on so), and/or other characteristics, for defining a fluid connection between the draining device and the air compressor. The base portion may define wide end of the T-shape and have the second fluid aperture or opening configured to fluidly couple with the water bib, including having a size, shape, and engagement features (e.g., threads, collars, and so on), and/or other characteristics, for defining a fluid connection between the draining device and the water bib.

The main body may also include one or more portions to facilitate the manipulation of the draining device relative to the air coupling and/or the water bib. For example, the main body portion may further define an intermediate portion, such as in one example a shoulder portion that is integrally formed with and arranged between, the base portion and the stem portion that is configured to define a tool engagement feature. The tool engagement feature may be a multifaceted surface that defines a series of landings for a tool, such as defining landings for engagement with channel locks, as one example. Additionally or alternatively, the intermediate portion may be a flexible conduit that is arranged between and connected to the base portion and the stem portion. Additionally or alternatively, the main body portion may further define one or more protrusions or wings extending laterally from one or both of the stem portion or the base portion. The one or more wings may define a gripping surface for a user's fingers. In this regard, the draining device may be manipulated by a tool and/or a user's fingers in order to tighten or loosen or otherwise manipulate the fluid coupling of the draining device between the air compressor and/or the water bib.

Turning to the Drawings, FIG. 1A shows an example system 100, including a structure 102 and a draining device 140, such as the draining device discussed generally above and described in greater detail below. The structure 102 may be a residential building having a plumbing system. An exterior wall 103 of the structure 102 is shown in FIG. 1A. The structure 102 may have a water faucet, spigot or valve, which may include a water spout, such as in one example may be a water bib 105 connected to the exterior wall 103. The water bib/water spout 105 may include or define a fluid coupling to a substantially indoor plumbing system of the structure 102. For example, the water bib 105 may be connected to a pipe run that extends through an uninsulated or poorly insulated area of a structure 102, such as a subfloor, wall, or attic. In one configuration, where a main water supply to the structure 102 is open, the water bib 105 may be used to expel water from the plumbing system of the structure 102. In another configuration, where the main water supply to the structure 102 is closed, the water bib 105 may provide a fluid coupling for introducing compressed air in to the plumbing system, such as with the draining device 140, as described herein.

For purposes of illustration, the water bib 105 is depicted in FIGS. 1A-1D as having a handle 107, a stem 109, a housing 111, an offshoot 113, a fluid coupling 115, and an opening 117. The housing 111 may include one or more components that is configured to mount the water bib to the exterior wall 103 and defines a fluid transition for the plumbing system of the structure 102 between an internal (e.g., subfloor) environment and an exterior environment. Positioned within the housing 111 may include the stem 109. The stem 109 may be manipulated by a handle 107 in order to control a flow of fluid through the housing 111, such as controlling the movement of a gate or other components within the housing 111. The offshoot 113 may extend from the housing 111 and define a pathway for fluid flow through the water bib 105 based on a state of the stem 109 and associated valve components. The offshoot 113 may terminate in the fluid coupling 115 that is generally configured to allow another component to fluidly couple with the water bib 105. In this regard, in one example, the fluid coupling 115 may define the opening 117 and define exterior threads. In other examples, other water bibs and configurations may be used and associated with the system 100 and draining device 140.

With continued reference to the system 100 of FIGS. 1A-1D, the system 100 may further include a pressure source 120, such as in one example an air source. The pressure source 120 may be an air compressor of various types, configurations, capacities, and ratings, or may be a source of fluids under pressure, such as a pump. For purposes of illustration, the pressure source 120 is shown and described herein in a non-limiting example, as being an air source, such as an air compressor including a compressor portion 122, a vessel portion 124, a power connect 126, an air hose 128, a coupling portion 129, and an opening 130. Broadly, the vessel portion 124 may define a volume of air which may be compressed or pressurized by the compressor portion 122 such that the air is caused to flow through the air hose 128 and exit via the opening 130 of the coupling portion 129. To facilitate the foregoing, the power connect 126 may be used to supply power to the compressor portion 122. In other examples, other types of pressure sources, and configurations may be used and associated with the system 100 and the draining device 140.

The system 100 may further include the draining device 140. The draining device 140 may broadly be configured to define a fluid coupling between the water bib 105 and the pressure source 120 and/or substantially any other water bib and pressure source, as contemplated herein. The draining device 140 may therefore be used to introduce fluid under pressure, such as compressed air from the air source 120, into a plumbing system of the structure 102 via the water bib 105. In the example construction of FIGS. 2 and 3, the draining device 140 may be configured to define a fluid coupling between the water bib 105 and the air source 120 using a main body 142 that is formed from a single piece of material. The single piece of material may include certain injection molded plastics, resins, synthetics, composites, reinforcement materials, and the like. In this regard, the main body 142 may be formed from an injection molding process. In other cases, the main body 142 may be formed from 3D printing and/or other additive-type manufacturing processes that result in the main body 142 being a single, unitary piece of material. The main body may be made of more than one piece assembled together into an integrated unit.

The main body 142 may define a T-shape or a cross-shape along a length of the draining device 140. For example, the main body 142 may have a width that transitions from a relative larger size to a relatively smaller size along a length of the draining device, including transitioning to a relatively smaller size that is at least 50%, at least 65%, at least 80% of the size of the relatively larger size. The shape of the main body 142 may allow the draining device 140 to fluidly couple the water bib 105 and the air source 120 and accommodate the differently sized coupling features, connectors, and so on of the water bib 105 and the air source 120. To illustrate, the fluid coupling 115 of the water bib 105 may have an outer diameter at the opening 117 greater than the inner diameter of the coupling portion 129 of the air source 120. For example, it may be up to around 3 times the diameter of the coupling portion 129 of the air source 120. In this regard, the main body 142 may broadly transition from a size that is suitable for accommodating the fluid coupling 115 of the water bib 105 (e.g., a size defining a wide lateral region of the T-shape) to a size that is suitable for accommodating the coupling portion 129 of the air source 120 (e.g., a size defining an elongated region of the T-shape).

Figure 1B:
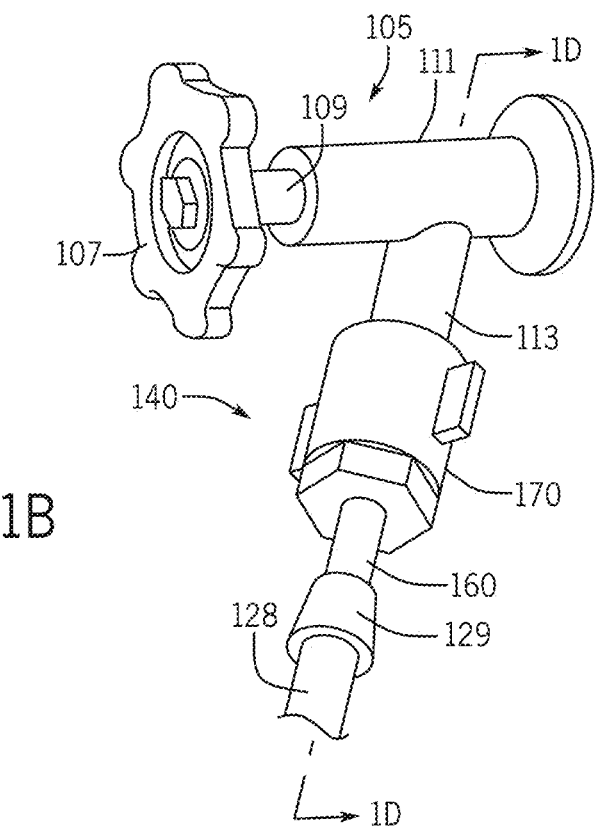
FIG. 1B depicts detail 1B-1B of FIG. 1A, including the draining device of FIG. 1A fluidly coupled with a water faucet and an air compressor coupling.
Figure 2:
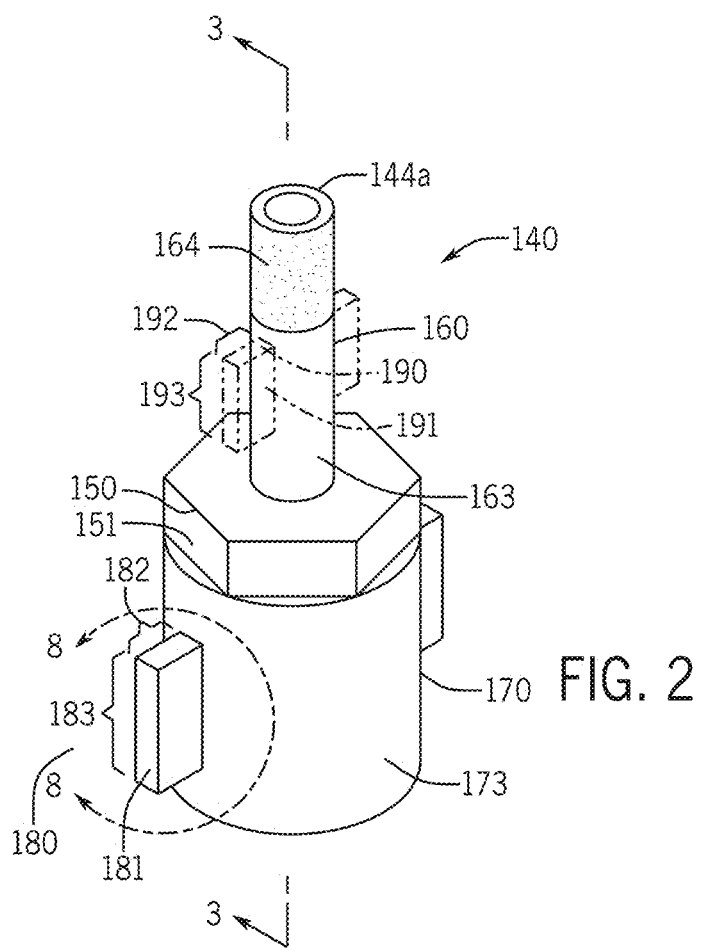
FIG. 2 depicts an isometric view of the draining device of FIG. 1.
Figure 3:
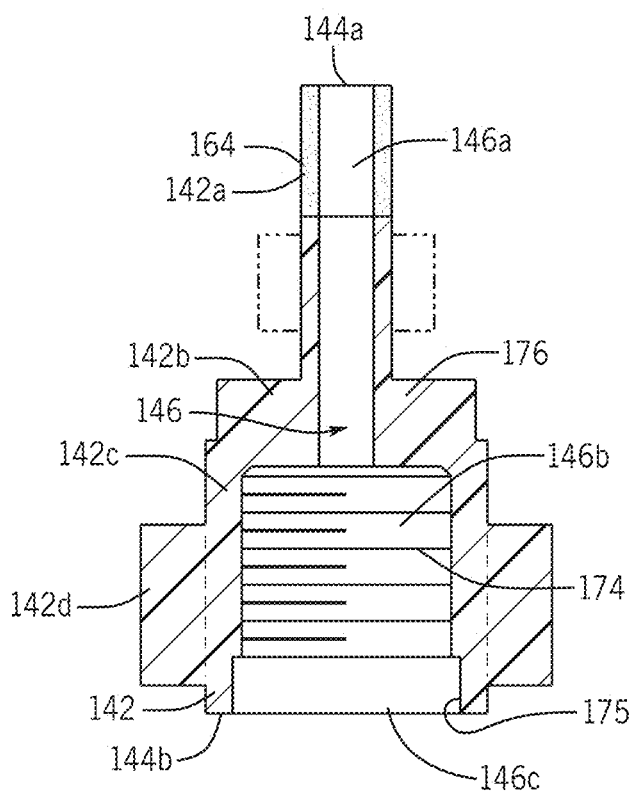
FIG. 3 depicts a cross-sectional view of the draining device of FIG. 2, taken along line 3-3 of FIG. 2.

In the example of FIGS. 2 and 3, the main body 142 is shown as including a stem portion body 142a, an intermediate portion body 142b, a base portion body 142c, and optionally a wing portion body 142d. The stem portion body 142a, the intermediate portion body 142b, the base portion body 142c, and the optional wing portion body 142d may each be portions of the same, single, unitary piece of material that defines the main body 142. The stem portion body 142a may define an elongated region of the T-shape of the main body 142. The base portion 142c may define a wider lateral region of the T-shape of the main body 142. The intermediate portion body 142b may generally be arranged between the stem portion body 142a and the base portion body 142c and transitions between the stem portion body 142a and the base portion 142c. In one example, shown and described in FIGS. 1 through 10c, the intermediate portion body may be a shoulder portion body having a width that is greater than a width of the stem portion body and that is less than a width of the base portion body 142c. In another example, as shown and described in FIGS. 11A and 11B, intermediate portion body may be a flexible conduit as described below. The wing portion body 142d may include at least one feature, such as in one example one or in another example a pair, that extends laterally from the main body 142. The wing portion 142d may extend from the base portion body 142c, or may extend from the stem portion body 142a, or may extend from the shoulder portion body 142b. The wing portion 142d may also extend from any two or all three of these portions. In some cases, the wing portion body 142d may include two features, extending form opposing sides of the base portion body 142c, as shown in FIG. 3, and that cooperate to further define a wide lateral region of the T-shape. In one example, the main body may define at least one wing, the wing being integrally formed with, and extending from a side of, the main body. Alternatively or additionally, the at least one wing may extend from the base portion. Alternatively or additionally, the at least one wing may extend from the stem portion. Alternatively or additionally, the at least one wing extends from the shoulder portion. Other examples of the wing portions are shown and described with respect to FIGS. 8, 8A, 8B, and 8C.

The main body 142 may further define an internal passage 146 extending through an entire length of the draining device 140. The internal passage 146 may be configured to conduct a flow of fluid through the draining device 140. In one example, the fluid is pressurized air, which flows through the draining device in the direction from aperture 144a to aperture 144b (see arrow in FIG. 3). The internal passage 146 may extend, for example, between a first aperture or opening 144a that is defined by the stem portion body 142a and a second aperture or opening 144b that is defined by the base portion body 142c. The first aperture may be configured to fluidly couple with a pressure source, such as for example an air supply. The second aperture may be configured to fluidly couple with a water bib. For example, the stem portion body 142a may define the first opening 144a with a first size and the base portion body 142c may define the second opening 144b with a second size that is different than the first size. The internal passage 146 may extend, internally, from the first opening 144a having the first size to the second opening 144b having the second size. In this regard, the size or diameter of the internal passage 146 may change correspondingly along the internal length of the main body 142.

As shown in FIG. 3, the internal passage 146 may, in one example, have a plurality of passage segments arranged, serially, between the first opening 144a and the second opening 144b that may include and/or be defined by different size, shapes, and features. For purposes of illustration, FIG. 3 shows the internal passage 146 as including a first passage section 146a, a second passage section 146b, and a third passage section 146c. The first passage section 146a may be defined principally by the stem portion body 142a and the shoulder portion body 142b. The first passage section 146a may have an inner diameter that generally matches the diameter or size of the first opening 144a. The first passage section 146a may extend through the entire elongated length of the stem portion body 142a from the first opening 144a and to the second passage section 146b. The second passage section 146b may be principally defined by the base portion body 142c. The second passage section 146b may have a diameter or size that is greater than the diameter or size of the first passage section 146a. The change in diameter or size may be abrupt or gradual. The second passage section 146*b* may be a portion of the draining device 140 configured for engagement with the water bib 105, as described further below. The second passage section 146*b* may extend from the first passage section 146*a* to the third passage section 146*c*. The third passage section 146*c* may be principally defined by the base portion body 142*c* and have a diameter or size that is about the same as or slightly or incrementally larger than the size or the diameter of the second passage section 146*b*. The third passage section 146*c* may extend from the second passage section 146*b* to the second opening 144*b* and may therefore have a diameter that generally matches the diameter or size of the second opening 144*b*. As shown in FIGS. 1C and 1D, a hose gasket 141 may be optionally used to help seat the end of the water bib 115 against a base wall formed between the third passage 146*c* and the second passage 146*b* and form a seal. Use of a hose gasket is not required.

The stem portion body 142*a* may define a stem portion 160 of the draining device 140. The stem portion 160 may broadly be a portion of the draining device 140 that is configured to fluidly couple with the air source 120 and/or other air supply. In this regard, the stem portion 160 may include various features, surfaces, contours, and the like of the stem portion body 142*a* the support fluid coupling of the draining device 140 to the air source 120. For example, and as shown in FIGS. 2 and 3, at the stem portion 160, the stem portion body 142*a* may define the first opening 144*a*. The stem body portion 142*a* may have an outer diameter that generally corresponds to an inner diameter of the coupling portion 129 of the air source 120, for example the outer diameter of stem 142*a* having a diameter of around 6 to 8 mm. At the stem portion 160, the stem portion body 142*a* is further shown including a stem surface 163 and an engagement surface 164. The stem surface 163 may be defined by a generally smooth contour, whereas the engagement surface 164 may be defined by a roughened, uneven, textured surface or like. The engagement surface 164 may be defined by a roughened texture for engagement by the coupling portion 129. For example, the engagement surface 164 may define a grip or landing for the coupling portion 129 such that the coupling portion 129 may be removably attachable to the stem portion 160 and define a fluid coupling therewith.

Figure 10A:
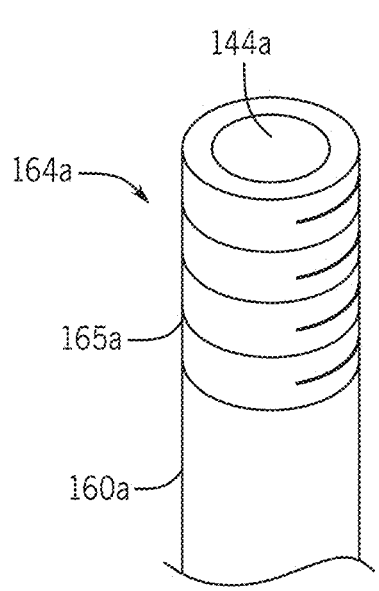
FIG. 10A depicts example stem portion of the draining device of FIG. 2.
Figure 10B:
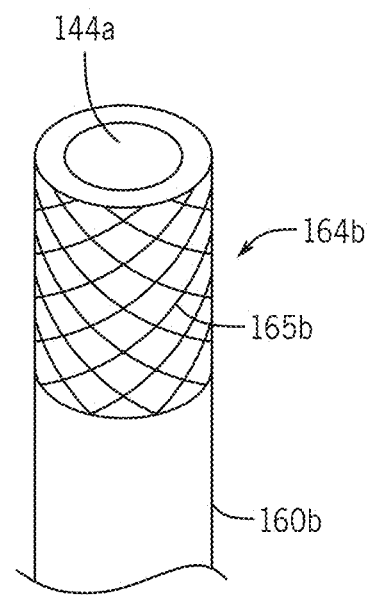
FIG. 10B depicts example stem portion of the draining device of FIG. 2.
Figure 10C:
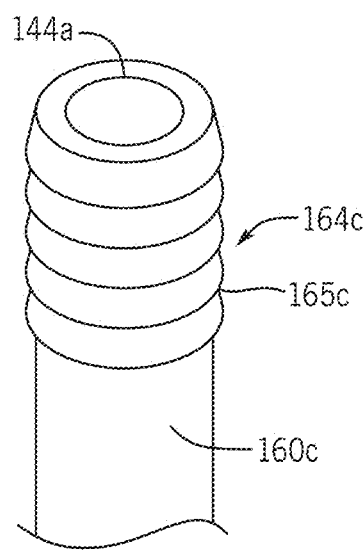
FIG. 10C depicts example stem portion of the draining device of FIG. 2.

It will be appreciated that the engagement surface 164 may take numerous forms based on the given application. FIGS. 10A-10C depict example implementation of the engagement surface 164 for the stem portion 160 of the draining device 140. For example, and with reference to FIG. 10A, a stem portion 160*a* for the draining device 140 is shown as having an engagement surface 164*a* with threads 165*a* that are configured to removably attach the stem portion 160 with the air source 120. As a further example, and with reference to FIG. 10B, a stem portion 160*b* for the draining device 140 is shown as having an engagement surface 164*b* with a scored surface 165*b* that is configured to removably attach the stem portion 160 with the air source 120. As a further example, and with reference to FIG. 10C, a stem portion 160*c* for the draining device 140 is shown as having an engagement surface 164*c* with a ratcheted surface 165*c* that is configured to removably attach the stem portion 160 with the air source 120. In other examples, other manners of the engagement surface may be used and are contemplated herein.

The engagement surface 164 and/or any of the variations thereof may generally be positioned adjacent the first opening 144*a*, as shown in FIG. 2. For example, the stem portion body 142*a* may define the elongated shape the engagement surface 164. The engagement surface 164 may span a subset of the elongated shape of the stem portion body 142, adjacent the opening 144*a*, such as at least about 50%, at least about 30%, at least about 15% of the total length of the stem portion body 142*a*. While FIG. 2 shows one example length of the stem portion body 142*a*, various lengths of the stem portion body 142*a* are contemplated herein. The engagement surface 164 may be positioned adjacent the first opening 144*a* notwithstanding the length of the stem portion body 142*a*. For example, and with reference to FIG. 4A, a truncated stem portion body 142*a*' is shown for the draining device 140 with the engagement surface 164 positioned adjacent the first opening 144*a*. As another example, and with reference to FIG. 4B, an extended stem portion body 142*a*" is shown for the draining device 140 with the engagement surface 164 positioned adjacent the first opening 144*a*. The different sizes of the sample stem portion bodies 142*a*, 142*a*', and 142" may also be configured to accommodate different sizes and types of air couplings, such as where a longer stem portion body may be used for a large air coupling and vice versa.

The base portion body 142*c* may define a base portion 170 of the draining device 140. The base portion 170 may broadly be a portion of the draining device 140 that is configured to fluidly couple with the water bib or faucet 105. In this regard, the base portion 170 may include various features, surface, contours, and the like of the base portion body 142*c* to support the fluid coupling of the draining device 140 to the water bib or faucet 105. For example, and as shown in FIGS. 2 and 3, at the base portion 170, the base portion body 142*c* may define the second opening 144*b*. The second opening 144*b* may have an inner diameter that generally corresponds to an outer diameter of the coupling 115 of the water bib 105, such as having an inner diameter of around 27 mm, in one example. At the base portion 170, the base portion body 142*c* is further shown including, within the second passage section 146*b*, a faucet or spout engagement feature 174. The faucet or spout engagement feature 174 may be defined by a series of threads formed from, and extending integrally from, the same material as the main body 142. In other cases, the faucet engagement feature 174 may be an insert, such as metal insert, coupled to the main body 142 within the second passage section 146*b*. In one example, the faucet engagement feature may be configured to threadably engage the coupling 115 of the water bib 105. Also, at the base portion 170, the base portion body 142*c* is further shown as including a collar region 175. The collar region 175 may be defined by a thinned-walled section of the base portion body 142*c*. The thinned-wall section of the base portion body 142*c* may define the third passage section 146*c* as having a slightly or incrementally larger diameter of the second passage section 146*b*. In this regard, during use, the second passage section 146*b* may receive the coupling 115 and the collar 175 may fit over slightly over the offshoot 113 that leads to the coupling 115, as shown in FIGS. 1B and 1D. The lightly or incrementally larger diameter of the third passage section 146*c* may allow the coupling 115 to move substantially unimpeded along the collar 175 when the draining device is in the process or removal or attachment with the water bib 105.

It will be appreciated that while FIG. 3 shows one example length and width configuration of the faucet engagement feature 174 and the collar 175, the draining device 140 may be adapted for various sizes and configurations based on a given application. For example, and with reference to FIG. 5A, a truncated faucet engagement portion 174' is shown for the draining device 140 alongside a modified collar 175'. As another example, and with reference to FIG. 5B, an extended faucet engagement feature 174" is shown for the draining device 140 alongside another modified collar 175". The different sizes of the faucet engagement features and collars may be configured to accommodate different sizes and types of water bibs.

Figure 8:
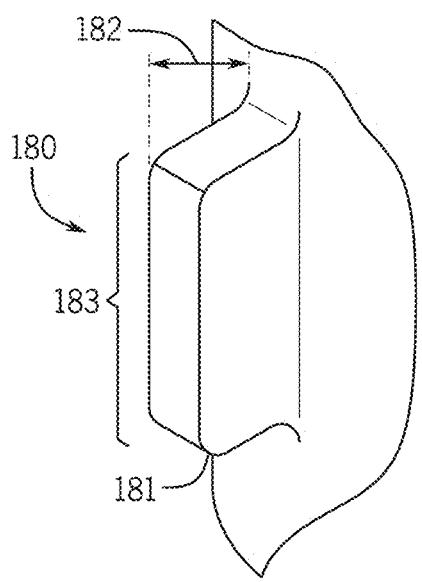
FIG. 8 depicts a detail view 8-8 of an example base wing portion of the draining device of FIG. 2.
Figure 8A:
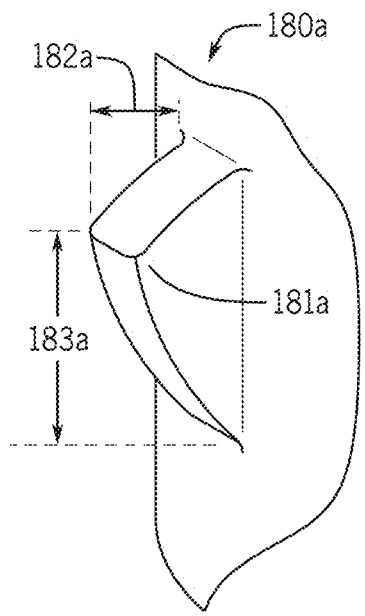
FIG. 8A depicts another example base wing portion of the draining device of FIG. 2
Figure 8B:
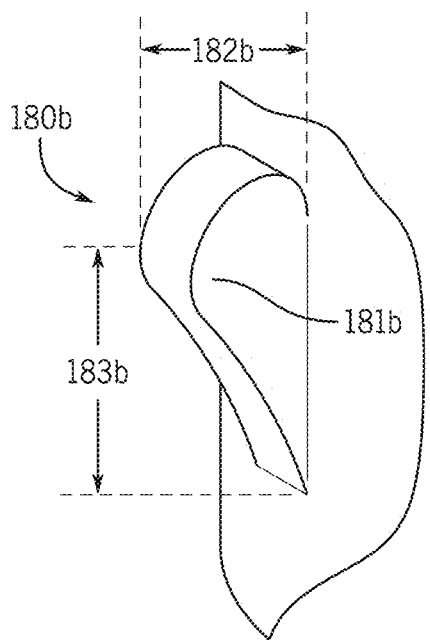
FIG. 8B depicts another example base wing portion of the draining device of FIG. 2.
Figure 8C:
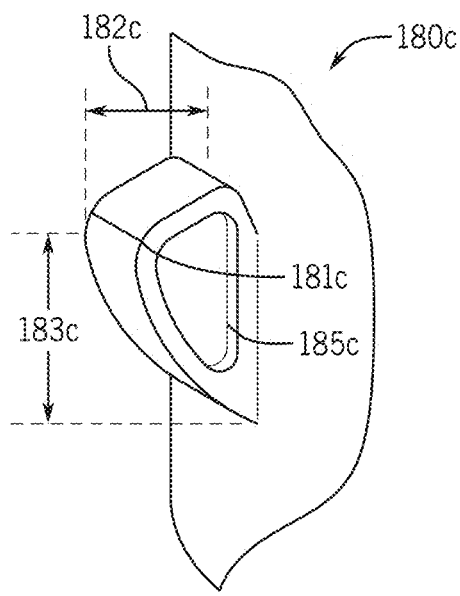
FIG. 8C depicts another example base wing portion of the draining device of FIG. 2.

With continued reference to FIGS. 2 and 3, at the base portion 170, the draining device 140 is shown including base portion wings 180. The base portion wings 180 may be defined by the wing portion body 142d and extend integrally from the base portion body 142c. For example, and as shown in FIG. 2, the base portion wings 180 may extend from an exterior surface 173 of the base portion 170. The base portion wings 180 may have a wing shape 181 that facilitates applying a torque through a user's grip, such as by a finger grip. In the example of FIG. 2, and as shown in the detail view of FIG. 8, the base portion wings 180 may have a generally rectangular shape with a wing width 182 and wing length 183 that is greater than the wing width 182. In other configurations, other shapes are possible and contemplated herein, as illustrated in the examples of FIGS. 8A-8C. For example, and with reference to FIG. 8A, a sample wing portion 180a is shown defined by a generally triangular wing shape 181a having a wing width 182a and a wing length 183a. As a further example, and with reference to FIG. 8B, a sample wing portion 180b is shown defined by a heart-shaped wing shape 181B having a wing width 182b and a wing length 183b. As a further example, and with reference to FIG. 8C, a sample wing portion 180c is shown defined by a contoured wing shape 181c have a wing width 182c and a wing length 183c. The sample wing portion 180c is shown further having an indented section 185c, which may facilitate engagement with a user's finger by providing a recessed landing on the wing portion 180c.

Figure 7A:
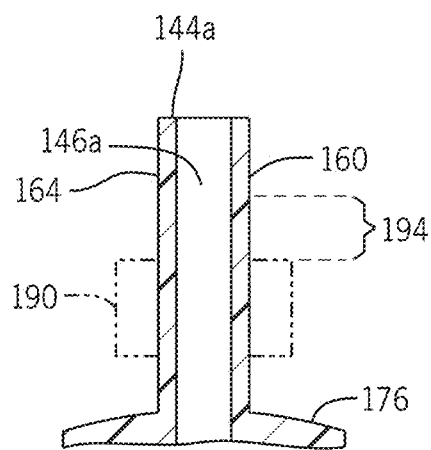
FIG. 7A depicts example offset stem wing portions for the draining device of FIG. 2.
Figure 7B:
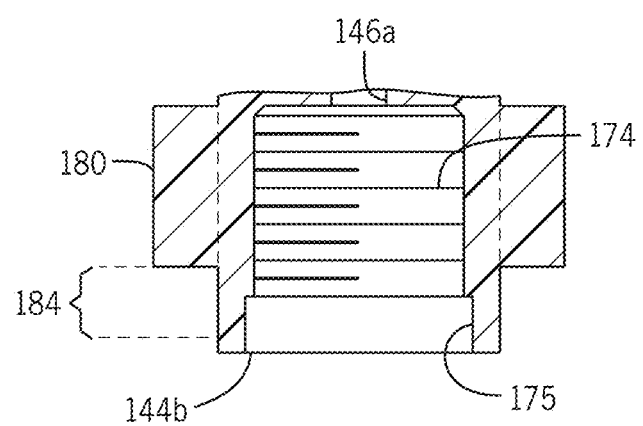
FIG. 7B depicts example offset base wing portions for the draining device of FIG. 2

The base portion wings 180 and/or any of the variations thereof may extend from opposing sides of the base portion body 142c, as shown in FIGS. 2 and 3. The base portion wings 180 may extend from the base portion body 142c at any appropriate distance from the second opening 144b, as needed for a given application. In the example of FIGS. 2 and 3, the base portion wings 180 may be arranged generally adjacent the second opening 144b and may improve the leverage or aid in the threading engagement by the user. In other cases, it may be appropriate define a separation between the base portion wings 180 and the second opening 144b. For example, as shown in FIG. 7B, the draining device 140 may include the base portion wings 180 at an offset 184 from the second opening 144b.

With continued reference to FIGS. 2 and 3, at the stem portion 160, the draining device 140 is shown including stem portion wings 190. The stem portion wings 190 may be defined by and be a portion of the main body 142, such that the stem portion wings 192 are defined by the same piece of material as, for example, the stem portion body 142a. The stem portion wings 190 may be optional components (shown in dash line) that extend from generally opposing sides of the stem portion body 142a. The stem portion wings 190 may have a wing shape 191 that facilitates applying a torque through a finger grip at the stem portion 160. In the example of FIG. 2, the stem portion wings 190 may have a generally rectangular shape with a wing width 192 and wing length 193 that is greater than the wing width 192. In other configurations, other shapes are possible and contemplated herein.

The stem portion wings 190 may extend from the stem portion body 142a at any appropriate distance from the first opening 144a and engagement surface 164, as needed for a given application. In the example of FIGS. 2 and 3, the stem portion wings 190 may be arranged generally adjacent the engagement surface 164. In other cases, it may be appropriate define a separation between the stem portion wings 190 and the engagement surface 164. For example, as shown in FIG. 7A, the draining device 140 may include the stem portion wings 190 at an offset 194 from the engagement surface 164.

With continued reference to FIGS. 2 and 3, the draining device 140 may include a shoulder portion 176, which may be formed at least in part by the intermediate portion. The shoulder portion 176 may broadly be a portion of the draining device 140 that is configured to transition the shape of the draining device 140 between the stem portion 160 and the base portion 170. Additionally, the shoulder portion 176 may also broadly be a portion of the draining device 140 that is configured for engagement with a tool, such as a pair of channel locks. In the example of FIGS. 2 and 3, the shoulder portion 176 may define a tool engagement feature 150. The tool engagement feature 150 may be configured to permit engagement or gripping by a tool, such as a pair of channel locks. For example, the tool engagement feature 150 may include a multifaceted peripheral surface 151. The multifaceted peripheral surface 151 may have a series of landings or flats that are generally disposed circumferentially about the draining device 140 at the shoulder portion 176. The landing or flats may be configured to receive the gripping surface or teeth or a tool. In the example of FIGS. 2 and 3, the multifaceted surface 151 includes six sides. In other cases, the multifaceted surface 151 may include more or fewer sides (such as four sides) and/or different sizes or geometries based on a given application.

Figure 9A:
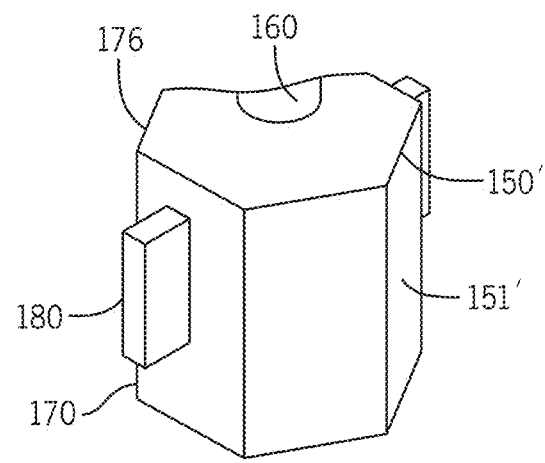
FIG. 9A depicts another example base portion of the draining device of FIG. 2.
Figure 9B:
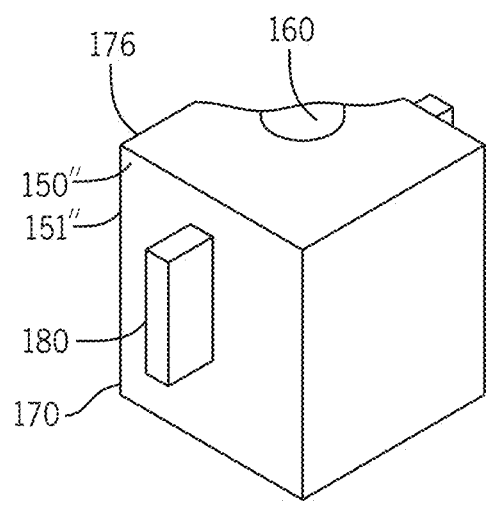
FIG. 9B depicts another example base portion of the draining device of FIG. 2.

The example of FIGS. 2 and 3 show the tool engagement feature 150 arranged between the stem portion 160 and the base portion 170. For example, the multifaceted peripheral surface 151 may be disposed between the stem surface 163 and the exterior surface 173, with the multifaceted surface 151 having a distinct shape as compared to either of the stem surface 163 or the exterior surface 173. FIGS. 9A and 9B depict examples in which a tool engagement feature may be integrated with the base portion 170 such that a multifaceted peripheral surface is defined by the shoulder portion 176 and the base portion 170. For example, and with reference to FIG. 9A, a tool engagement feature 150' is shown for the draining device 140 having a multi-faceted peripheral surface 151' that is defined by each of the shoulder portion 176 and the base portion 170. This arrangement may facilitate engagement of the draining device 140 by a tool by increasing the surface area of the landings or flats that receive the tool. As a further example, and with reference to FIG. 9B, a toll engagement feature 150" is shown for the draining device 140 having a multifaceted peripheral surface 151" that is defined by each of the shoulder portion 176 and the base portion 170. In the example of FIG. 9B, the multifaceted peripheral surface 151" includes four sides. The gripping surface formed by the wings for a user's fingers to grip may be implemented on the draining device together with or independently from the multi-faceted peripheral surface for an application of a tool (wrench) by a user.

Figure 6A:
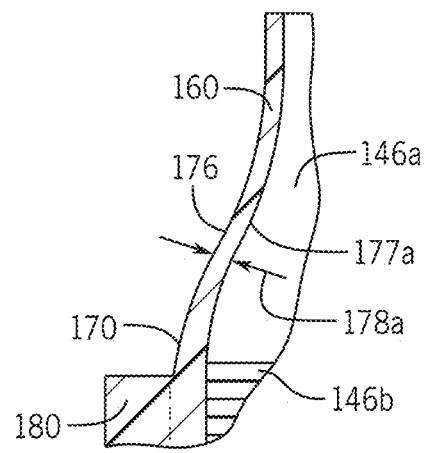
FIG. 6A depicts an example tapered transition portion for the draining device of FIG. 2.
Figure 6B:
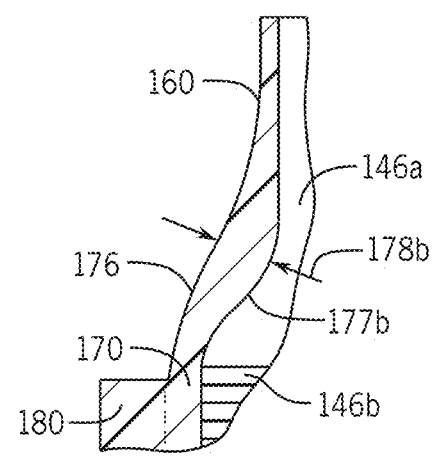
FIG. 6B depicts another example tapered transition portion for the draining device of FIG. 2.

The shoulder portion 176 may also be configured to define a transition between the stem portion 160 and the base portion 170. In the example of FIGS. 2 and 3, a stepwise or abrupt transition may be defined, as the shoulder portion 176 has a width that greater than that stem portion 160 where the shoulder portion 176 and the stem portion 160 meet. FIGS. 6A and 6B depict examples in which the shoulder portion 176 defines a more gradual or sloping transition between the stem portion 160 and the base portion 170. For example, and with reference to FIG. 6, the shoulder portion 176 for the draining device 140 is shown including a contoured transition 177a between the stem portion 160 and the base portion 170. The contoured transition 177a may define a slope between the stem portion 160 and the base portion 170 such that the draining device 140 generally resembles the shape of wine bottle. In FIG. 6A, the shoulder portion 176 is shown as having a cross-sectional thickness 178a that may be substantially maintained along the transition between the stem portion 160 and the base portion 170. In one example, the shoulder portion 176 defines a contoured transition 177a with a consistent wall thickness 178a along at least a portion of the length of the shoulder 176 in the transition 177a. As a further example, and with reference to FIG. 6B, the shoulder portion 176 for the draining device 140 is shown including a contoured transition 177b between the stem portion 160 and the base portion 170. In FIG. 6B, the shoulder portion 176 is shown as having a cross-sectional thickness 178b that may include an enlarged or reinforced region along the transition between the stem portion 160 and the base portion 170. In one example, the shoulder portion 176 defines a contoured transition 177b with a wall thickness 178b increasing to form a reinforced region, the increased thickness being adjacent the base portion 170.

Figures 11A, 11B:
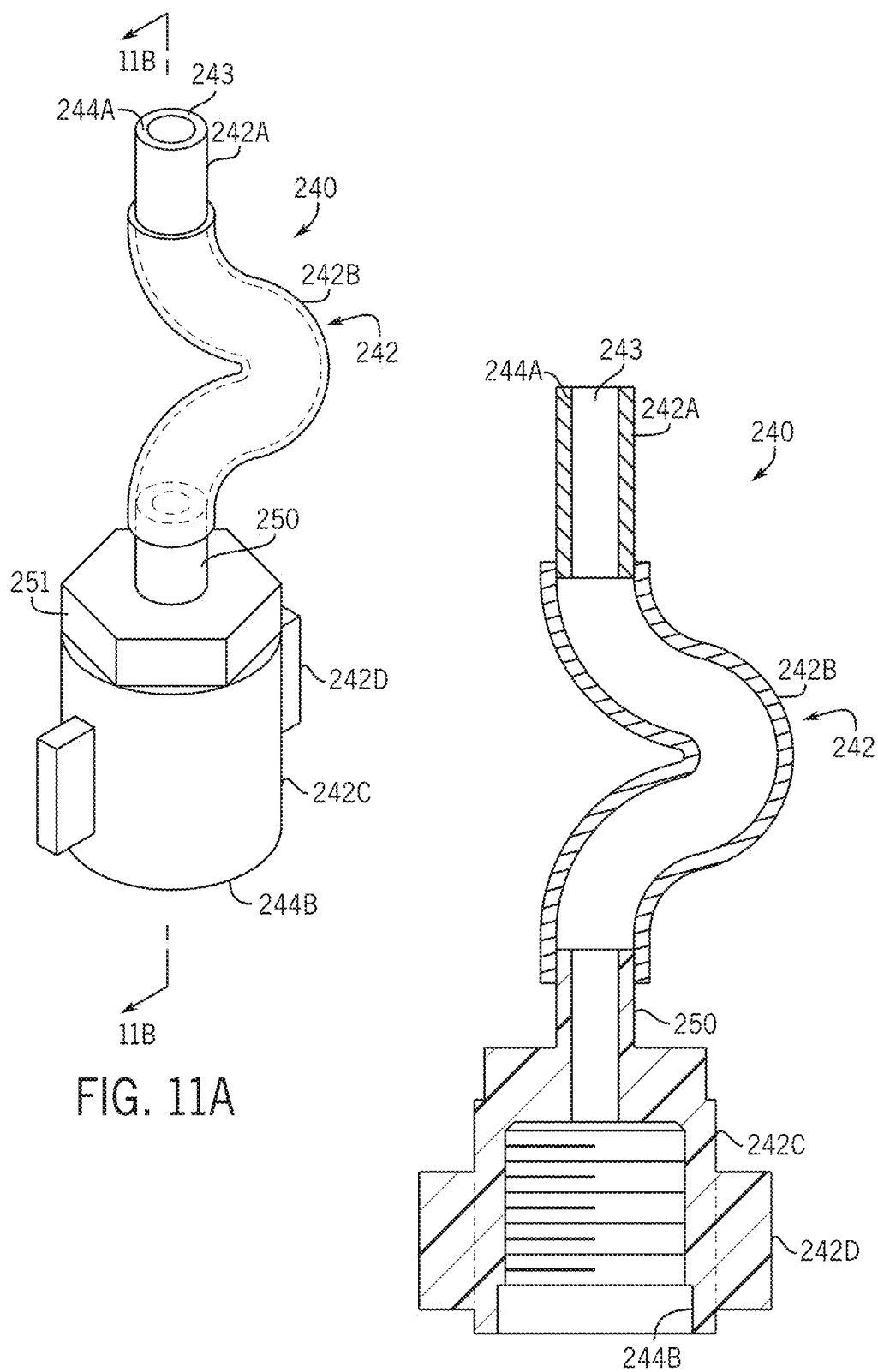
FIG. 11A is another example of the draining device.
FIG. 11B is a section of the draining device taken along the line 11B-11B in FIG. 11A.

Another example of the draining device 240 is shown in FIGS. 11A and 11B. In this example, the draining device 240 includes many of the same features, structures, and function as the examples of the draining device 140 described and shown in FIGS. 1 through 10c, unless specifically noted. The main body 242 is shown as including a stem portion body 242a, an intermediate portion body 242b, a base portion body 242c, and optionally a wing portion body 242d. The intermediate portion body 242b may generally be arranged between the stem portion body 242a and the base portion body 242c and may define a conduit 243 extending between the stem portion body 242a and the base portion 242c. The conduit 243 may be rigid, for example being made of metal or rigid plastic, or flexible, for example being made of rubber or another material that allows the base portion 242c and stem portion 242a be repositioned relative to one another. In this example, the wing portion body 242d may extends laterally from the stem portion 242a or the base portion 242c. The wing portion 242d may be mounted on the conduit 243, anywhere along its length, and may take the form or an enlarged section, or one or more protrusions.

The main body 242 may further define an internal passage 246 extending through an entire length of the draining device 240. The internal passage 246 may be configured, similar to internal passage 146 in FIG. 3, to conduct a flow of fluid through the draining device 240. The internal passage 246 may extend, for example, between a first opening 244a that is defined by the stem portion body 242a and a second opening 244b that is defined by the base portion body 242c. For example, the stem portion body 242a may define the first opening 244a with a first size and the base portion body 242c may define the second opening 244b with a second size that is different than the first size. The internal passage 246 may extend, internally, from the first opening 244a having the first size to the second opening 244b having the second size. In this regard, the size or diameter of the internal passage 246 may change correspondingly along the internal length of the main body 242.

Referring to FIGS. 11A and 11B, one end of the conduit 243 may engage a collar 250 extending from an end 252 of the base portion 242c. The collar 250 may have an outer diameter sized to mate with the inner diameter of the conduit 243. The other end of the conduit may engage an end of the stem portion 242a. The end of the stem portion may have an outer diameter sized to mate with inner diameter of the conduit 243.

The conduit 243 may allow relative movement of the stem portion 242a and base portion 242c. The conduit 243, whether rigid or flexible, allows the stem portion 242a and base portion 242c to be separated by a greater distance than the shoulder portion 176 of the device 140, which may be advantageous in certain instances, such as where the water bib 115 is located high off the ground and hard to reach. Where the conduit is manipulable, such as for example being resiliently flexible, the conduit 243 may allow the stem portion 242a and base portion 242c to be angled or oriented separately from one another to allow more convenient access to each for ease of attachment of the base portion 242c to the water bib 115, and/or the stem portion 242a to the coupling portion 129 of the air hose 128. In some examples, the conduit 243 may be flexible and be selectively moveable to a position and may retain the selected position. In this example the conduit 243 may be made of a braided metal outer sheath with an inner tube that may retain a selected shape, or may include a rotatable bead structure, such as is shown and described in U.S. Pat. No. 7,533,906, which is incorporated by reference herein. In one example, the multi-faceted peripheral surface 251 may be positioned on the outer surface of the base portion 242c. In one example, the multi-faceted peripheral surface 251 may be formed in a top peripheral rim of the base portion 242c.

Figure 12:
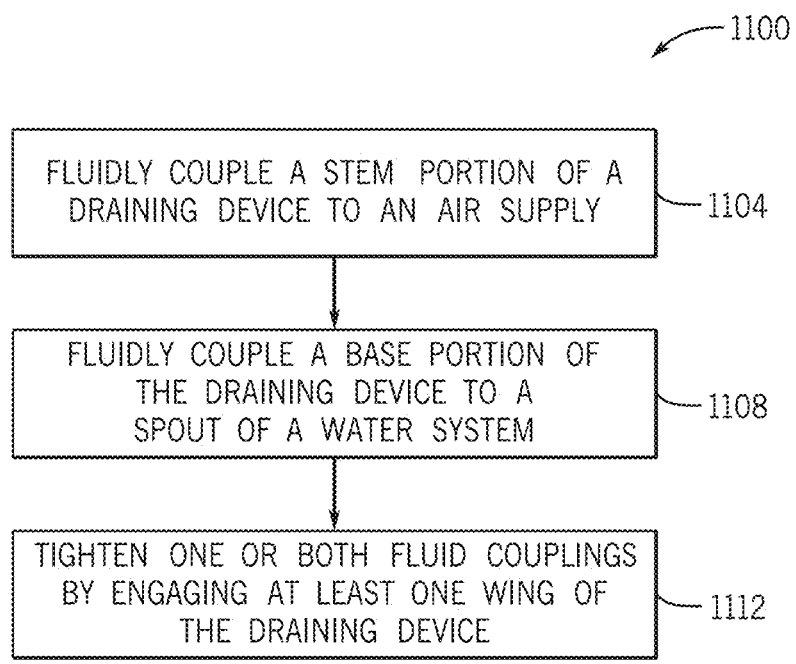
FIG. 12 depicts a flow diagram of a method of using the draining device of FIG. 2.

To facilitate the reader's understanding of the various functionalities of the examples discussed herein, reference is now made to the flow diagram in FIG. 12, which illustrates process 1100. While specific steps (and orders of steps) of the methods presented herein have been illustrated and will be discussed, other methods (including more, fewer, or different steps than those illustrated) consistent with the teachings presented herein are also envisioned and encompassed with the present disclosure.

At operation 1104, a stem portion of a draining device may be fluidly coupled to a pressure source, such as in one example an air supply. The pressure source may also include a source of fluid pressure. For example, and with reference to FIGS. 1C and 1D, the stem portion 160 of the draining device 140 may be fluidly coupled the air source 120. To illustrate, the coupling portion 129 of the air hose 128 may be removably coupled with the stem portion 160 of the draining device 140. As shown in FIGS. 1C and 1D, the stem portion 160 may be received into the opening 130 of the coupling portion 129 such that the coupling portion 129 engages the engagement surface 164 of the stem portion 160. The coupling portion 129 may have a complementary surface or feature that allows the coupling portion 129 to grip the engagement surface 164. Additionally or alternatively, the roughened surface texture of the engagement surface 164 may be used to establish a friction fit between the stem portion 160 and the coupling portion 129 and/or otherwise operate to impede movement between the stem portion 160 and the coupling portion 129. Additionally or alternatively, the coupling portion 129 may include one or more clips, quick-connects, and/or other features that allow the coupling portion 129 to removably attached to the draining device 140 at the stem portion 160. With the coupling portion 129 removably attached to the stem portion 160, as depicted in FIG. 1D, the first opening 144a may be arranged within or adjacent to the coupling 129 for fluidic coupling between the air hose 128 and the internal passage 146.

At operation 1108, a base portion of the draining device may be fluidly coupled to a spout of a water source, such as a water bib. The base portion and the stem portion may in one example may be integrally formed with one another and defined a common fluid passage through the winterizing structure. In another example, the base portion and the stem portion may be connected by an elongated flexible conduit (such as shown in FIGS. 11A and 11B) to allow for misalignment of the base portion relative to the stem portion, where helpful for use. With reference to FIGS. 1C and 1D, for example, the base portion 170 may receive the coupling 115 in the second opening 144b such that the coupling 115 engages the faucet engage feature 174 within the internal passage 146. The coupling 115 may have a complementary surface or feature that allows the coupling 115 to engage the faucet engagement feature 174. For example, the coupling 115 and the faucet engagement feature 174 may include complementary threads that are configured to define a threaded engagement between the water bib 105 and the draining device 140. With the coupling 115 removably attached to the base portion 170, as depicted in FIG. 1D, the internal passage 146 of the draining device 140 may be arranged for fluidic coupling between the water bib 105.

At operation 1112, the fluid coupling of one or both of: the stem portion and the air supply, or the base portion and the spout, may be tightened by engaging at least one wing extending integrally from the stem portion or the base portion. For example, and with reference to FIGS. 1C and 1D, the wing portions 180 of the draining device 140 may be manipulated in order to tighten or loosen draining device 140 relative to the coupling 115. As an illustration, the wing portion 180 may facilitating applying a torque through a finger grip. In this regard, a user may grip one or both of the wing portions 180 in order to adjust the draining device as needed. Additionally or alternatively, the tool engagement feature 150 may be manipulated, such as with a pair of channel locks, in order to facilitate a similar tightening or loosening of the draining device 140.

Upon connection of the draining device 140 to the air source 120 and the water bib 105, for example as described with respect to operations 1104-1112, the draining device 140 may be used to evacuate water from a plumbing system, such as the plumbing system of the structure 102 shown in FIG. 1A. In one example operation, a main water intake valve to the structure 102 may be closed. The water bib 105 may be manipulated into an open position so that fluid may flow freely there through. Further, a second water bib of the structure 102 may also be opened so that fluid may flow freely there through. Next, the air source 120 may induce a flow of air through the air hose 128 and into the draining device 140 at the stem portion 160. The draining device 140 may direct the flow of air to water bib 105 and into the coupling 115. The compressed air may continue into the plumbing system of the structure 102 for evacuation of water held therein. For example, the compressed air may travel through the plumbing system and cause residual water in the plumbing system to exit via the second water bib. The air source 120 may continue to operate until the water is sufficiently removed from the plumbing system. The air source 120 may be subsequently turned off and removed from the draining device 140. The draining device 140 may be removed from the water bib 105. The water bib 105 and the second water bib may be manipulate to close the respective valve components and close the plumbing system of the structure, with the water having been substantially evacuated.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A draining device for use with a fluid spout, the draining device comprising:
    a main body formed of a unitary single piece of material, the main body defining:
        a stem portion defining a first aperture at a first end of the main body to fluidly couple with a pressure source,
        a base portion coupled with the stem portion and defining a second aperture at a second end of the main body to fluidly couple with the fluid spout, the base portion defining spout engagement features extending from an interior of the base portion about the second aperture, and
        at least one wing integrally formed with and protruding from the base portion or the stem portion by a width dimension that is less than a length dimension of the at least one wing,
        an internal passage extending from the first aperture to the second aperture; and
    wherein
        the main body fluidly couples a pressure source and the fluid spout through the passage,
        the main body further defines an intermediate portion arranged between the base portion and the stem portion,
        the intermediate portion is a shoulder portion integrally formed with the base portion and the stem portion, and
        the shoulder portion defines a contoured transition with a wall thickness increasing to form a reinforced region, the increased thickness being adjacent the base portion.

2. The draining device of claim 1, wherein the spout engagement feature is integrally formed with the main body and configured to releasably secure the draining device to the fluid spout.

3. The draining device of claim 2, wherein
    the main body further defines a collar region adjacent the spout engagement feature and opposite the stem portion, and
    the collar region is configured to fit about the fluid spout and permit unimpeded passage through the fluid spout.

4. The draining device of claim 3, wherein
    the spout engagement feature is defined by a series of interior threads, and
    the collar region is defined by a thinned-walled section of the base portion.

5. The draining device of claim 1, wherein the shoulder portion defines a tool engagement feature.

6. The draining device of claim 5, wherein the tool engagement feature comprises a multifaceted peripheral surface at the shoulder portion.

7. The draining device of claim 6, wherein the multifaceted peripheral surface includes at least four sides.

8. The draining device of claim 1, wherein the at least one wing is integrally formed with and extending from a first side of the base portion or the stem portion, and a second wing is integrally formed with and extends from an opposing side of the stem portion or the base portion relative to the first side.

9. The draining device of claim 1, wherein the at least one wing extends from the base portion.

10. The draining device of claim 1, wherein the at least one wing extends from the stem portion.

11. The draining device of claim 1, wherein the at least one wing extends from the shoulder portion.

12. The draining device of claim 1, wherein the stem portion comprises an engagement surface at the first aperture, the engagement surface being configured to removably attach a coupling portion of the pressure source to the stem portion.

13. The draining device of claim 12, wherein
the engagement surface is defined by a roughened or threaded outer surface of the stem portion.

14. The draining device of claim 1, wherein the intermediate portion is a conduit.

15. The draining device of claim 14, wherein the conduit is rigid.

16. The draining device of claim 14, wherein the conduit is flexible.

17. A draining device for use with a fluid spout, the draining device comprising:
a main body comprising:
a stem portion comprising an engagement surface to releasably couple with a coupling portion of a pressure source and a first fluid opening at a first end of the draining device,
a base portion comprising a spout engagement feature to releasably couple with a fluid spout of the fluid spout extending integrally from an interior of the base portion about a second fluid opening at a second end of the draining device opposite the first end,
at least one wing integrally formed with the main body and protruding by a width dimension that is less than a length dimension; and
wherein
the stem portion and the base portion are formed of a unitary single piece of material and define a common fluid passage between the first fluid opening at the stem portion and the second fluid opening at the base portion,
the main body further defines an intermediate portion arranged between the base portion and the stem portion,
the intermediate portion is a shoulder portion integrally formed with the base portion and the stem portion, and
the at least one wing extends from the shoulder portion.

18. The draining device of claim 17, wherein
the stem portion is defined by a stem portion body having a first width, and
the base portion is defined by a base portion body having a second width that is greater than the first width.

19. The draining device of claim 17, wherein the shoulder portion is multifaceted and formed between the stem portion and the base portion.

20. The draining device of claim 19, wherein the at least one wing is integrally formed with the base portion, the at least one wing defining a finger grip.

21. The draining device of claim 19, wherein the shoulder portion is positioned around a top edge of the base portion.

22. The draining device of claim 17, wherein
the first fluid opening has a first diameter,
the second fluid opening has a second diameter, and
the second diameter is greater than the first diameter.

23. The draining device of claim 17, wherein the shoulder portion defines a stepwise transition between the stem portion and the base portion.

24. The draining device of claim 17, wherein the shoulder portion defines a contoured transition with a consistent wall thickness along at least a portion of the length of the shoulder.

25. A draining device for use with a fluid spout, the draining device comprising:
a main body, the main body formed of a unitary single piece of material and defining:
a stem portion defining a first aperture to fluidly couple with a pressure source at a first end of the main body and having a first outer diameter,
a base portion defining a second aperture to fluidly couple with the fluid spout at a second end of the main body opposite the first end, the base portion including spout engagement features extending integrally from an interior of the base portion about the second aperture, the second end having a second outer diameter greater than the first outer diameter,
an integrally formed wing extending from the main body and integrally formed with and protruding outward by a width dimension that is less than a length dimension,
an internal passage extending continuously from the first aperture to the second aperture, and
wherein
the main body fluidly couples a pressure source and the fluid spout through the passage,
the main body further defines an intermediate portion arranged between the base portion and the stem portion,
the intermediate portion is a shoulder portion integrally formed with the base portion and the stem portion, and
the integrally formed wing extends from the shoulder portion.

* * * * *